United States Patent
Wang et al.

(10) Patent No.: US 12,488,501 B2
(45) Date of Patent: Dec. 2, 2025

(54) METHOD AND SYSTEM FOR TRACKING OBJECT BY AGGREGATION NETWORK BASED ON HYBRID CONVOLUTION AND SELF-ATTENTION

(71) Applicant: NANCHANG INSTITUTE OF TECHNOLOGY, Nanchang (CN)

(72) Inventors: Jun Wang, Nanchang (CN); Peng Yin, Nanchang (CN)

(73) Assignee: NANCHANG INSTITUTE OF TECHNOLOGY, Nanchang (CN)

( * ) Notice: Subject to any disclaimer, the term of this patent is extended or adjusted under 35 U.S.C. 154(b) by 307 days.

(21) Appl. No.: 18/356,315

(22) Filed: Jul. 21, 2023

(65) Prior Publication Data
US 2024/0104772 A1 Mar. 28, 2024

(30) Foreign Application Priority Data
Sep. 27, 2022 (CN) .......................... 202211177692.8

(51) Int. Cl.
*G06T 7/73* (2017.01)

(52) U.S. Cl.
CPC ...... *G06T 7/74* (2017.01); *G06T 2207/20012* (2013.01); *G06T 2207/20081* (2013.01); *G06T 2207/20084* (2013.01)

(58) Field of Classification Search
CPC .... G06N 3/0455; G06N 3/0464; G06N 3/048; G06N 3/082; G06N 3/09;
(Continued)

(56) References Cited

U.S. PATENT DOCUMENTS

2022/0254023 A1* 8/2022 McKinney ........ G06F 18/24133
2022/0383489 A1* 12/2022 Shi ............................ G06T 7/11
(Continued)

FOREIGN PATENT DOCUMENTS

| CA | 3196713 C | * | 11/2023 | ........... G06T 7/0012 |
| CN | 117274661 A | * | 12/2023 | ........... G06V 10/764 |
| WO | WO-2024009222 A1 | * | 1/2024 | ............. G06N 3/084 |

OTHER PUBLICATIONS

Shervin Minaee et al., "Image Segmentation Using Deep Learning: A Survey," Jun. 3, 2022, IEEE Transactions On Pattern Analysis and Machine Intelligence, vol. 44, No. 7, Jul. 2022, pp. 3523-3534.*
(Continued)

*Primary Examiner* — Omar S Ismail
(74) *Attorney, Agent, or Firm* — BROOKS KUSHMAN P.C.

(57) ABSTRACT

Corresponding template features and search features are obtained by convolution operation, and respectively used as input features in aggregation modules. Intermediate features are obtained by performing convolution operation on the input features. The aggregation modules share the same convolution operation, and hybrid convolution in the aggregation module uses a depthwise convolution and a pointwise convolution to separate mixture between space and channel of the intermediate features. Redundancy in spatial and channel features is reduced while increasing receptive field. Self-attention module in the aggregation module learns intermediate features, and adaptively focuses on different regions to capture more global correlations. Output features of the hybrid convolution are added to output features of the self-attention module to pass through a drop-out layer to obtain final output features. The output features aggregate local and global context information. Overfitting of network
(Continued)

is alleviated during training, thereby improving generalization ability of tracker.

10 Claims, 5 Drawing Sheets

(58) Field of Classification Search
CPC . G06T 2207/20012; G06T 2207/20081; G06T 2207/20084; G06T 7/20; G06T 7/74; Y02T 10/12
See application file for complete search history.

(56) References Cited

U.S. PATENT DOCUMENTS

| | | | | |
|---|---|---|---|---|
| 2022/0384035 | A1* | 12/2022 | Shi | G06V 10/774 |
| 2022/0398402 | A1* | 12/2022 | Jin | G06V 20/46 |
| 2023/0222454 | A1* | 7/2023 | Cella | G06N 7/01 705/28 |
| 2024/0135514 | A1* | 4/2024 | Pakhomov | G06T 7/70 |
| 2024/0362815 | A1* | 10/2024 | Joachim | G06T 11/00 |
| 2024/0378832 | A1* | 11/2024 | Joachim | G06T 5/50 |

OTHER PUBLICATIONS

Yulan Guo et al.,"Deep Learning for 3D Point Clouds: A Survey," Nov. 3, 2021, IEEE Transactions On Pattern Analysis and Machine Intelligence, vol. 43, No. 12, Dec. 2021, pp. 4338-4350.*

Mang Ye et al.,"Deep Learning for Person Re-Identification: A Survey and Outlook," May 5, 2022, IEEE Transactions On Pattern Analysis and Machine Intelligence, vol. 44, No. 6, Jun. 2022, p. 2872-2887.*

Qigao Zhou et al.,"Hyperspectral Image Classification Based on 3-D Multihead Self-Attention Spectral-Spatial Feature Fusion Network," Jan. 9, 2023, IEEE Journal of Selected Topics in Applied Earth Observations and Remote Sensing, vol. 16, 2023, pp. 1072-1080.*

Xuran Pan et al.,"On the Integration of Self-Attention and Convolution," Jun. 2022, Proceedings of the IEEE/CVF Conference on Computer Vision and Pattern Recognition (CVPR), 2022, pp. 815-822.*

Qingtian Wu et al.,"Parallel Self-Attention and Spatial-Attention Fusion for Human Pose Estimation and Running Movement Recognition,"Feb. 12, 2024, IEEE Transactions On Cognitive and Developmental Systems, vol. 16, No. 1, Feb. 2024, pp. 358-366.*

Tolga Turay et al.,"Toward Performing Image Classification and Object Detection With Convolutional Neural Networks in Autonomous Driving Systems: A Survey," Feb. 8, 2022, IEEE Access, vol. 10,2022, pp. 14076-14090.*

Chenhang He et al.,"Voxel Set Transformer: A Set-to-Set Approach to 3D Object Detection from Point Clouds," Jun. 2022, Proceedings of the IEEE/CVF Conference on Computer Vision and Pattern Recognition (CVPR), 2022, pp. 8417-8421.*

Xinyang Song et al.,"Remote Sensing Image Change Detection Transformer Network Based on Dual-Feature Mixed Attention," Oct. 11, 2022, IEEE Transactions On Geoscience and Remote Sensing, vol. 60, 2022,pp. 1-7.*

* cited by examiner

METHOD AND SYSTEM FOR TRACKING OBJECT BY AGGREGATION NETWORK BASED ON HYBRID CONVOLUTION AND SELF-ATTENTION

CROSS-REFERENCE TO RELATED APPLICATION

This application claims foreign priority benefits under 35 U.S.C. § 119 (a)-(d) to Chinese Patent Application No. 202211177692.8 filed on Sep. 27, 2022, which is hereby incorporated herein by reference in its entirety.

TECHNICAL FIELD

The present disclosure relates to the technical field of computer vision and image processing, in particular to a method and system for tracking an object by an aggregation network based on hybrid convolution and self-attention.

BACKGROUND

Object tracking is a fundamental research task in computer vision, which aims to estimate an object position in a video sequence given the initial state of the tracked object. At present, object tracking is widely used in vision fields such as visual positioning, automatic driving systems, and smart cities. However, it remains a challenging task for designing a high-precision tracker due to effects of object motion blur, fast motion, low resolution, and background clutter.

Convolutional neural networks (CNNs) and self-attention are two main techniques in object tracking, which have superior performance in feature learning. CNN-based and self-attention-based trackers can achieve state-of-the-art tracking performance, but are generally considered to be two different equivalent approaches. Specifically, the tracking algorithms based on these two technologies can roughly include the following two types: (1) some trackers can extract features of the template branch and features of the search branch by CNN, and calculate the similarity between the features of the two branches by a feature fusion network based on self-attention, thereby achieving robust tracking; (2) other trackers can implement object tracking as a matching process, and use a self-attention-based transformer as a feature extraction network and the feature fusion network to further improve performance of the trackers.

CNNs can effectively extract local information from related feature maps by small neighborhood convolution operations. However, due to the inherent characteristics of CNNs, there is a serious inductive deviation when dealing with objects of different scales; meanwhile, the limited receptive field of CNNs makes it difficult to capture global dependencies. In contrast, the self-attention mechanism uses image patches as the input representation and applies a weighted average operation on the context of input features, and then dynamically calculates the attention weights by a similarity function between related pixel pairs. Although such dynamic calculation allows the attention module to adaptively focus on different areas, capture more information features, and effectively capture long-distance dependencies, blind similarity matching between all image patches can lead to high redundancy.

Based on the above technical problems, it is necessary to propose a method and system for tracking an object by an aggregation network based on hybrid convolution and self-attention to solve these above technical problems.

SUMMARY

In view of the above situation, it is a main purpose of the present disclosure to propose a method and system for tracking an object by an aggregation network based on hybrid convolution and self-attention to solve these above technical problems.

In one embodiment, a method for tracking an object by an aggregation network based on hybrid convolution and self-attention is provided, wherein the method includes the following steps:

step 1, initialization operation
  initializing a given first image frame and a search region of a subsequent image frame respectively to obtain a target template image and a search image; and performing a convolution operation on the target template image and the search image respectively to obtain template features and search features;
step 2, establishment of aggregation modules
  establishing a plurality of aggregation modules based on hybrid convolution and self-attention; performing a convolution operation on the template features and the search features for learning; and mapping the template features and the search features into a same feature space to obtain intermediate features of a template branch and intermediate features of a search branch respectively;
step 3, generation of hybrid convolution features
  inputting the intermediate features of the template branch into the hybrid convolution comprising a depthwise convolution and a pointwise convolution; processing, by the hybrid convolution, the intermediate features of the template branch; and performing a concatenation operation to obtain hybrid convolution features of the template branch;
  inputting the intermediate features of the search branch into the hybrid convolution comprising the depthwise convolution and the pointwise convolution; processing, by the hybrid convolution, the intermediate features of the search branch; and performing the concatenation operation to obtain hybrid convolution features of the search branch;
step 4, generation of self-attention features
  inputting the intermediate features of the template branch into the self-attention; mapping, by the self-attention, the intermediate features of the template branch to obtain three feature maps respectively used as a query, key and value of the template branch in the self-attention; performing similarity matching on the query and key of the template branch to obtain a first self-attention weight; calculating global features of the template branch with the first self-attention weight and the value of the template branch; and performing the concatenation operation to obtain self-attention features of the template branch;
  inputting the intermediate features of the search branch into the self-attention; mapping, by the self-attention, the intermediate features of the search branch to obtain three feature maps respectively used as a query, key and value of the search branch in the self-attention; performing similarity matching on the query and key of the search branch to obtain a second self-attention weight; calculating global features of the search branch with the second self-attention weight and the value of the search branch; and performing the concatenation operation to obtain self-attention features of the search branch;

step 5, connection of hybrid convolution features with self-attention features connecting the hybrid convolution features of the template branch with the self-attention features of the template branch to pass through a drop-out layer to obtain output features of the template branch of the aggregation modules based on hybrid convolution and self-attention;

connecting the hybrid convolution features of the search branch with the self-attention features of the search branch to pass through the drop-out layer to obtain output features of the search branch of the aggregation modules based on hybrid convolution and self-attention;

hierarchically stacking the aggregation modules based on hybrid convolution and self-attention to establish a feature aggregation network with shared weights; and step 6, object tracking training the feature aggregation network with a large-scale data set to obtain a tracking model; fusing the output features of the template branch with the output features of the search branch by a convolution operation according to the tracking model to obtain a response position of the object in the search region in order to realize accurate tracking.

The present disclosure proposes a method for tracking the object by the aggregation network based on hybrid convolution and self-attention. First, the corresponding template features and search features are obtained by the convolution operation, and respectively used as the input features of the template branch and the search branch in the aggregation module. Rich intermediate features can be obtained by performing the convolution operation on the input features. In addition, the aggregation modules share the same convolution operation, and the hybrid convolution in the aggregation module uses the depthwise convolution and the pointwise convolution to separate the mixture between space and channel of the intermediate features. The redundancy in spatial and channel features can be reduced while increasing receptive field, and the local features can be obtained. The self-attention module in the aggregation module learns intermediate features, captures long-distance dependencies, and adaptively focuses on different regions to capture more global correlation. Finally, the output features of the hybrid convolution are added to the output features of the self-attention module, and the features by the addition pass through the drop-out layer to obtain the final output features. The output features aggregate local and global context information. Thereinto, the drop-out layer is added for alleviating the overfitting of the network during training, thereby improving the generalization ability of the tracker.

In one embodiment, in step 2, performing the convolution operation on the template features and the search features for learning includes:

decomposing a convolution with a convolution kernel of k×k into $k^2$ separate 1×1 convolutions, and performing projecting and mapping on the template features or the search features as input features with the $k^2$ separate 1×1 convolutions, wherein a corresponding formula is expressed as:

$$\tilde{f}_{i,j}^{\ i} = K_{p,q} f_{i,j}^{\ i},$$

wherein $\tilde{f}_{i,j}^{\ i}$ represents an intermediate feature tensor of the input features, $f_{i,j}^{\ i}$ represents a feature tensor of the input feature $F_i$ at a pixel coordinate (i,j), $K_{p,q}$ represents a convolution kernel weight in a relative position (p,q) of the convolution kernel, i represents a horizontal coordinate of the pixel, and j represents a vertical coordinate of the pixel.

In one embodiment, in step 3, processing, by the hybrid convolution, the intermediate features of the template branch or the intermediate features of the search branch includes: performing, by the hybrid convolution, a depth convolution shift and summation operation on the intermediate features of the template branch or the intermediate features of the search branch;

wherein an output feature tensor of the depth convolution shift and summation operation is expressed as:

$$f_{i,j}^{D} = \sum_{p,q \in (0,1,2)} \text{shift}\left(K_{p,q} \tilde{f}_{i+\Delta x, j+\Delta y}^{\ j}\right),$$

wherein $f_{i,j}^{D}$ represents the output feature tensor of the depth convolution shift and summation operation, shift represents a shift operation, $\tilde{f}_{i+\Delta x, j+\Delta y}^{\ i}$ represents an intermediate feature tensor after shifting, $\Sigma$ represents a summation operation, $\Delta x$ represents a horizontal displacement, and $\Delta y$ represents a vertical displacement.

In one embodiment, step 3 further includes:

mixing channel positions by the pointwise convolution, and inputting the output feature tensors of the hybrid convolution and the intermediate feature tensors of the input features into the pointwise convolution to select important channel features; and performing the concatenation operation on the output feature tensors of the hybrid convolution to obtain the hybrid convolution features.

In one embodiment, the output feature tensor of the hybrid convolution is expressed as:

$$f_{i,j}^{o} = BN\left(\sigma\left(\sum_{p,q \in (0,1,2)} \text{shift}\left(K_{p,q}\left(f_{i,j}^{D} + \tilde{f}_{i,j}^{\ i}\right)\right)\right)\right),$$

wherein $f_{i,j}^{o}$ represents the output feature tensor of the hybrid convolution, BN(●) represents a batch normalization operation, and σ(●) represents a rectified linear activation function; and the hybrid convolution feature is expressed as:

$$F_{conv} = \text{Concat}(f_{1,i,j}^{o}, \ldots, f_{n,i,j}^{o}),$$

wherein $F_{conv}$ represents the hybrid convolution feature, Concat(●) represents the concatenation operation, $f_{1,i,j}^{o}$ represents the output feature tensor of a first hybrid convolution, and $f_{n,i,j}^{o}$ represents the output feature tensor of a $n^{th}$ hybrid convolution.

In one embodiment, in step 4, the intermediate features are divided into N sets, each set includes the three feature maps obtained by 1×1 convolutions, and the three feature maps are respectively mapped as the query, key and value, which are expressed as:

$$q_{i,j} = W_q \tilde{f}_{i,j}^{\ i}, k_{i,j} = W_k \tilde{f}_{i,j}^{\ i}, v_{i,j} = W_v \tilde{f}_{i,j}^{\ i},$$

wherein $q_{i,j}$ represents a query feature mapping tensor of the pixel coordinate (i,j) in the input feature $F_i$, $k_{i,j}$ represents a key feature mapping tensor of the pixel coordinate (i,j) in the input feature $F_i$, $v_{i,j}$ represents a value feature mapping tensor of the pixel coordinate (i,j) in the input feature $F_i$, $W_q$ represents a projection matrix of the query, $W_k$ represents a projection matrix of the key, $W_v$ represents a projection matrix of the value, and $\tilde{f}_{i,j}^i$ represents the intermediate feature tensor of the input features.

In one embodiment, in step 4, the first and second self-attention weights are expressed as:

$$A\left(W_q, \tilde{f}_{i,j}^i, W_k \tilde{f}_{a,b}^i\right) = \underset{a,b \in R_k(i,j)}{soft\max}\left(\frac{\left(W_q \tilde{f}_{i,j}^i\right)^T \left(W_k \tilde{f}_{a,b}^i\right)}{\sqrt{d}}\right),$$

wherein $A(W_q\tilde{f}_{i,j}^i, W_k\tilde{f}_{a,b}^i)$ represents the self-attention weight, soft max(●) represents a normalized exponential activation function, d represents a query feature dimension, $R_k(i,j)$ represents a local area of the pixel in a spatial range r centered on the pixel coordinate (i,j), $\tilde{f}_{a,b}^i$ represents a feature tensor of the intermediate features at the pixel coordinate (a,b), and T represents a transposition operation.

In one embodiment, calculating the global features with the self-attention weight and the value includes:
performing a summation operation on the self-attention weight and the value feature mapping tensor to collect the global features, which is expressed as:

$$g_{i,j}^o = \|\left(\sum_{a,b \in R_k(i,j)} A\left(W_q \tilde{f}_{i,j}^i, W_k \tilde{f}_{a,b}^i\right) W_v \tilde{f}_{a,b}^i\right),$$

wherein $g_{i,j}^o$ represents an output feature tensor of a self-attention module, ∥ represents a concatenation operation of outputs of self-attention heads, and N represents a number of the self-attention heads.

In one embodiment, in step 5, the output feature of the aggregation modules based on hybrid convolution and self-attention is expressed as:

$$F_{out} = \alpha F_{conv} + \beta F_{att},$$

wherein $F_{out}$ represents the output feature of the aggregation modules based on hybrid convolution and self-attention, $F_{conv}$ represents the hybrid convolution feature, $F_{att}$ represents the self-attention feature, α represents a first deviation factor, and β represents a second deviation factor.

In other embodiments, a system for tracking an object by an aggregation network based on hybrid convolution and self-attention is provided, wherein the system includes:
an initialization operation module, configured to:
initialize a given first image frame and a search region of a subsequent image frame respectively to obtain a target template image and a search image, and perform a convolution operation on the target template image and the search image respectively to obtain template features and search features;
an aggregation module establishing module, configured to:
establish a plurality of aggregation modules based on hybrid convolution and self-attention, perform a convolution operation on the template features and the search features for learning, and map the template features and the search features into a same feature space to obtain intermediate features of a template branch and intermediate features of a search branch respectively;

a hybrid convolution feature generating module, configured to:
input the intermediate features of the template branch into the hybrid convolution comprising a depthwise convolution and a pointwise convolution; process, by the hybrid convolution, the intermediate features of the template branch; and perform a concatenation operation to obtain hybrid convolution features of the template branch;
input the intermediate features of the search branch into the hybrid convolution comprising the depthwise convolution and the pointwise convolution; process, by the hybrid convolution, the intermediate features of the search branch; and perform the concatenation operation to obtain hybrid convolution features of the search branch;
a self-attention feature generating module, configured to:
input the intermediate features of the template branch into the self-attention; map, by the self-attention, the intermediate features of the template branch to obtain three feature maps respectively used as a query, key and value of the template branch in the self-attention; perform similarity matching on the query and key of the template branch to obtain a first self-attention weight; calculate global features of the template branch with the first self-attention weight and the value of the template branch; and perform the concatenation operation to obtain self-attention features of the template branch;
input the intermediate features of the search branch into the self-attention; map, by the self-attention, the intermediate features of the search branch to obtain three feature maps respectively used as a query, key and value of the search branch in the self-attention; perform similarity matching on the query and key of the search branch to obtain a second self-attention weight; calculate global features of the search branch with the second self-attention weight and the value of the search branch; and perform the concatenation operation to obtain self-attention features of the search branch;
a feature connection module, configured to:
connect the hybrid convolution features of the template branch with the self-attention features of the template branch to pass through a drop-out layer to obtain output features of the template branch of the aggregation modules based on hybrid convolution and self-attention;
connect the hybrid convolution features of the search branch with the self-attention features of the search branch to pass through the drop-out layer to obtain output features of the search branch of the aggregation modules based on hybrid convolution and self-attention;
hierarchically stack the aggregation modules based on hybrid convolution and self-attention to establish a feature aggregation network with shared weights; and
an object tracking module, configured to:
train the feature aggregation network with a large-scale data set to obtain a tracking model; fuse the output features of the template branch with the output features of the search branch by a convolution operation according to the tracking model to obtain a response position of the object in the search region in order to realize accurate tracking.

The additional aspects and advantages of the present disclosure will be partially presented in the following description, and will partly become apparent from the fol-

DETAILED DESCRIPTION

Embodiments of the present disclosure are described in detail below, examples of which are shown in the drawings, wherein the same or similar reference numerals indicate the same or similar elements or elements with the same or similar functions throughout the specification. The embodiments described below with reference to the accompanying drawings are exemplary only for explaining the present disclosure, but should not be understood as limitations to the present disclosure.

These and other aspects of embodiments of the disclosure will become apparent with reference to the following description and drawings. In these description and drawings, some specific implementations of the embodiments of the present disclosure are specifically disclosed to represent some ways for the principles of implementing embodiments of the present disclosure, but it should be understood that the scope of the embodiments of the present disclosure is not limited by these description and drawings. On the contrary, the embodiments of the present disclosure include all variants, modifications and equivalents falling within the spirit and scope of the appended claims.

Figure 1:
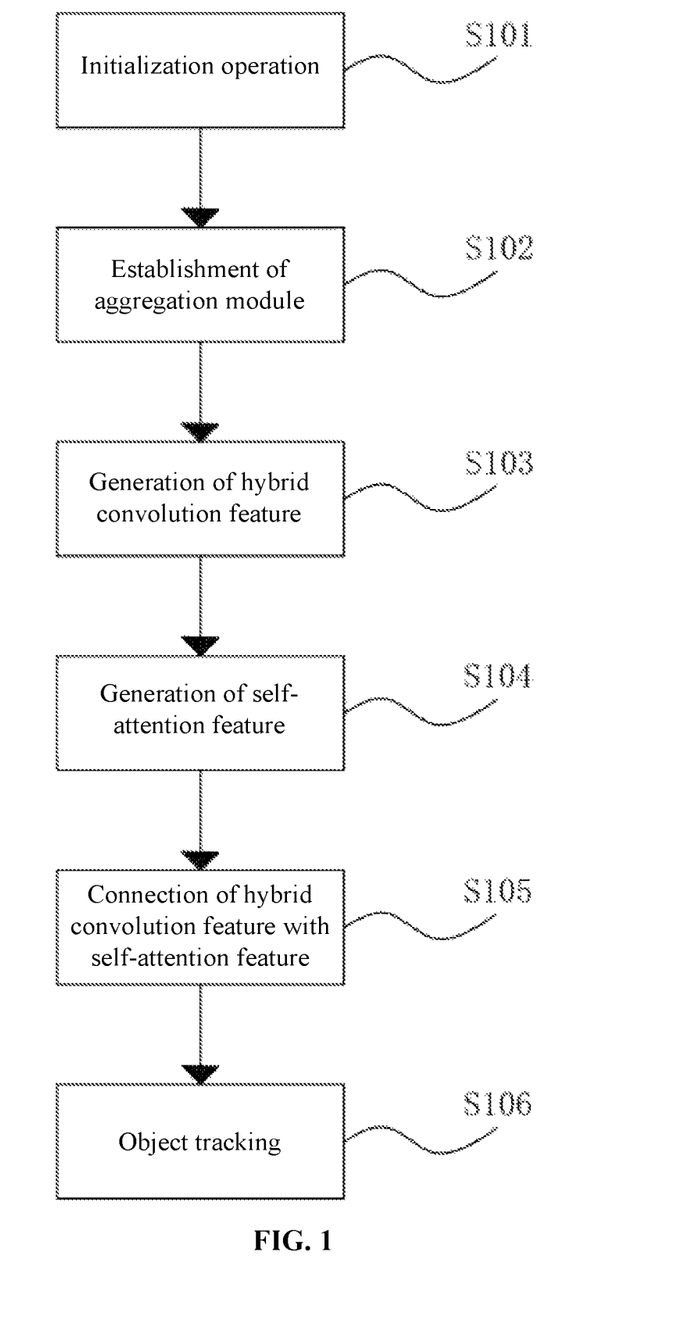
FIG. 1 is a flowchart of the method for tracking the object by the aggregation network based on hybrid convolution and self-attention according to the present disclosure.
Figure 2:
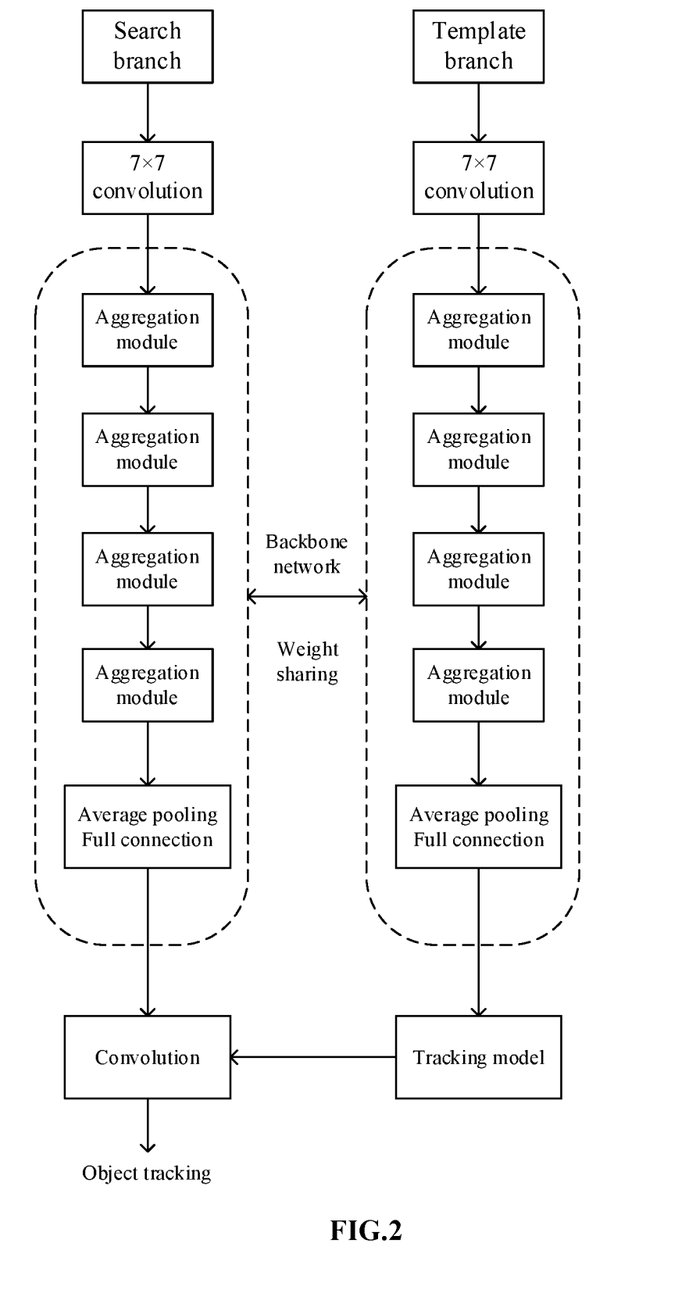
FIG. 2 is a structure diagram of an object tracking framework of the aggregation network based on hybrid convolution and self-attention according to the present disclosure.

Please refer to FIGS. 1 and 2. FIG. 1 is a flowchart of the method for tracking the object by the aggregation network based on hybrid convolution and self-attention according to the present disclosure, and FIG. 2 is a structure diagram of an object tracking framework of the aggregation network based on hybrid convolution and self-attention according to the present disclosure. The present disclosure proposes the method for tracking the object by the aggregation network based on hybrid convolution and self-attention according to the present disclosure, wherein the method includes the following steps S101-S106:

S101, initialization operation.

A given first image frame and a search region of a subsequent image frame are initialized respectively to obtain a target template image and a search image. Then, a convolution operation is performed on the target template image and the search image respectively to obtain template features and search features.

S102, establishment of aggregation module.

A plurality of aggregation modules based on hybrid convolution and self-attention are established. The convolution operation is performed on the template features and the search features for learning, and the template features and the search features are mapped into a same feature space to obtain intermediate features of a template branch and intermediate features of a search branch respectively.

Figure 3:
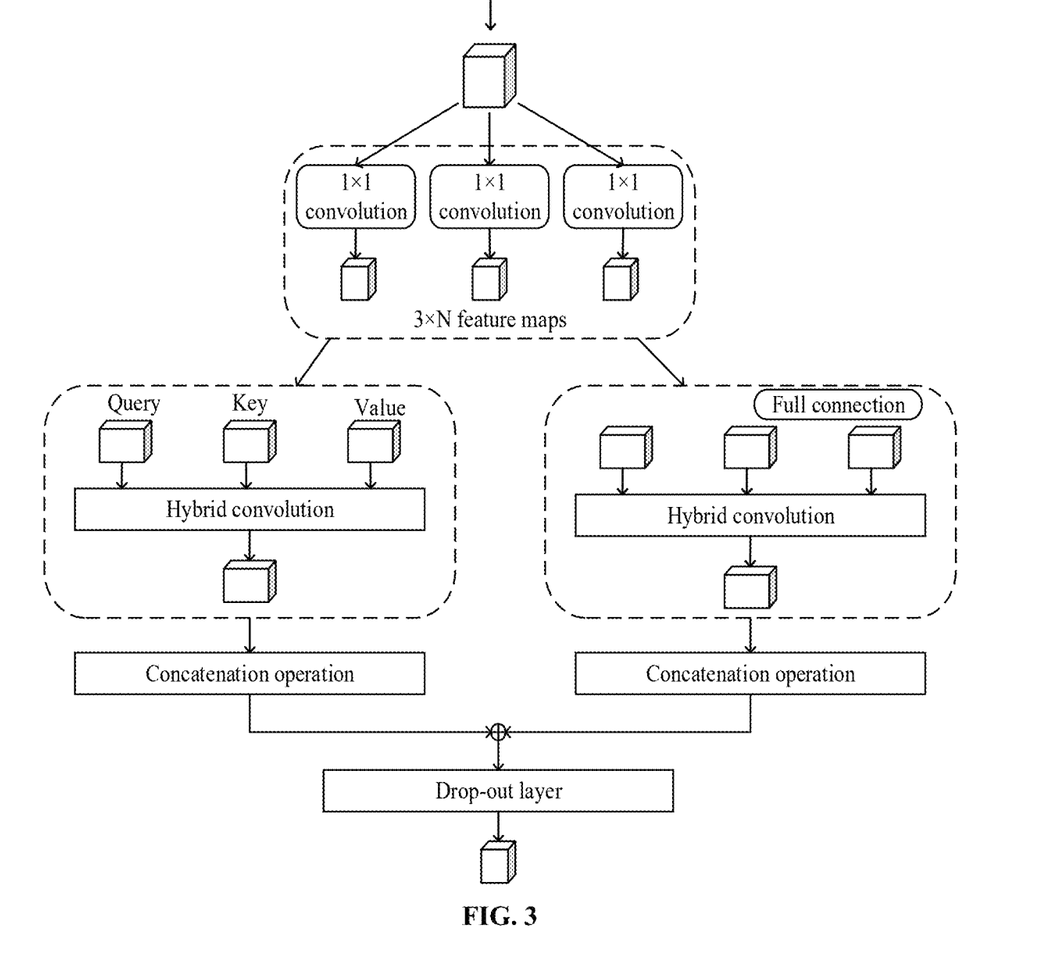
FIG. 3 is a schematic structure diagram of the principle of the aggregation module based on hybrid convolution and self-attention according to the present disclosure.

Specifically, FIG. 3 has obviously shown the principle of the aggregation module based on hybrid convolution and self-attention according to the present disclosure. In this embodiment, a method for generating the aggregation module based on hybrid convolution and self-attention including the following steps:

A convolution with a convolution kernel of k×k is decomposed into $k^2$ separate 1×1 convolutions. As input features, the template features or the search features are projected and mapped by the $k^2$ separate 1×1 convolutions, and the corresponding formula is expressed as:

$$\tilde{f}_{i,j}^{\,i} = K_{p,q} f_{i,j}^{\,i},$$

wherein $\tilde{f}_{i,j}^{\,i}$ represents an intermediate feature tensor of the input features, $f_{i,j}^{\,i}$ represents a feature tensor of the input feature $F_i$ at a pixel coordinate (i,j), $K_{p,q}$ represents a convolution kernel weight in a relative position (p,q) of the convolution kernel, i represents a horizontal coordinate of the pixel, and j represents a vertical coordinate of the pixel.

S103, generation of hybrid convolution feature.

The intermediate features of the template branch are input into the hybrid convolution including a depthwise convolution and a pointwise convolution, and are processed by the hybrid convolution. Then, a concatenation operation is performed to obtain hybrid convolution features of the template branch.

The intermediate features of the search branch are input into the hybrid convolution including the depthwise convolution and the pointwise convolution, and are processed by the hybrid convolution. Then, the concatenation operation is performed to obtain hybrid convolution features of the search branch.

Figure 4:
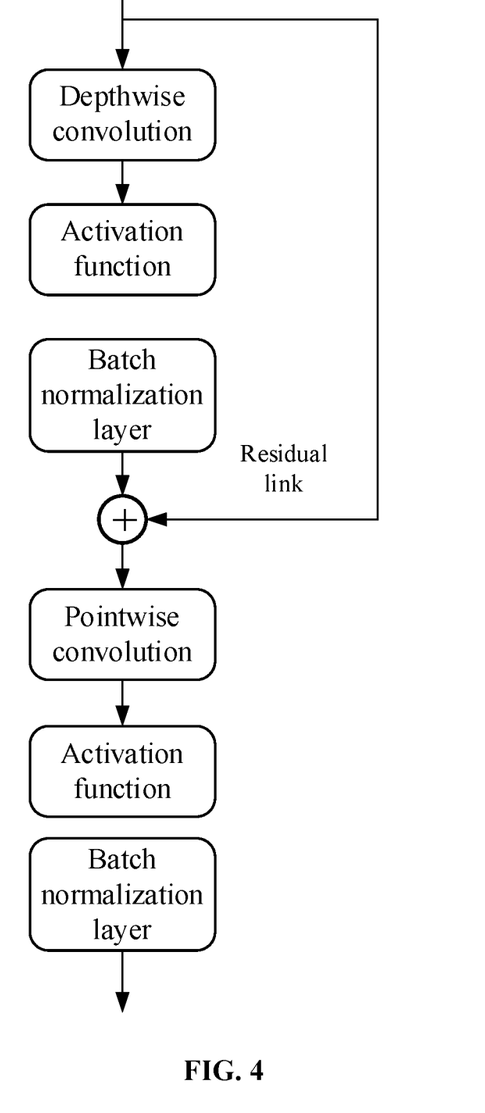
FIG. 4 is a principle diagram of the hybrid convolution in the aggregation network based on hybrid convolution and self-attention according to the present disclosure.

FIG. 4 shows the principle for generating the hybrid convolution according to the present disclosure.

In step S103, a depth convolution shift and summation operation is performed on the intermediate features of the template branch or the intermediate features of the search branch by the hybrid convolution.

An output feature tensor of the depth convolution shift and summation operation is expressed as:

$$f_{i,j}^{D} = \sum_{p,q \in (0,1,2)} \mathrm{shift}\left(K_{p,q} \tilde{f}_{i+\Delta x, j+\Delta y}^{\,j}\right),$$

wherein $f_{i,j}^{D}$ represents the output feature tensor of the depth convolution shift and summation operation, shift represents a shift operation, $\tilde{f}_{i+\Delta x, j+\Delta y}^{\,i}$ represents an intermediate feature tensor after shifting, $\Sigma$ represents a summation operation, $\Delta x$ represents a horizontal displacement, and $\Delta y$ represents a vertical displacement.

Specifically, step S103 specifically includes S1031 and S1032:

S1031, channel positions are mixed by the pointwise convolution, and the output feature tensors of the hybrid convolution and the intermediate feature tensors of the input features are input into the pointwise convolution to select important channel features.

The output feature tensor of the hybrid convolution is expressed as:

$$f^o_{i,j} = BN\left(\sigma\left(\sum_{p,q\in(0,1,2)} \text{shift}\left(K_{p,q}\left(f^D_{i,j} + \tilde{f}^i_{i,j}\right)\right)\right)\right),$$

wherein $f^o_{i,j}$ represents the output feature tensor of the hybrid convolution, BN(●) represents a batch normalization operation, and σ(●) represents a rectified linear activation function.

S1032, the concatenation operation is performed on the output feature tensors of the hybrid convolution to obtain the hybrid convolution features.

The hybrid convolution feature is expressed as:

$F_{conv} = \text{Concat}(f^o_{1,i,j}, \ldots, f^o_{n,i,j}),$ wherein $F_{conv}$ represents the hybrid convolution feature, Concat(●) represents the concatenation operation, $f^o_{1,i,j}$ represents the output feature tensor of a first hybrid convolution, and $f^o_{n,i,j}$ represents the output feature tensor of a $n^{th}$ hybrid convolution.

S104, generation of self-attention feature.

The intermediate features of the template branch are input into the self-attention, are mapped by the self-attention to obtain three feature maps respectively used as a query, key and value of the template branch in the self-attention. Similarity matching is performed on the query and key of the template branch to obtain a first self-attention weight. Global features of the template branch are calculated with the first self-attention weight and the value of the template branch, and then the concatenation operation is performed to obtain self-attention features of the template branch.

The intermediate features of the search branch are input into the self-attention, are mapped by the self-attention to obtain three feature maps respectively used as a query, key and value of the search branch in the self-attention. Similarity matching is performed on the query and key of the search branch to obtain a second self-attention weight. Global features of the search branch are calculated with the second self-attention weight and the value of the search branch, and then the concatenation operation is performed to obtain self-attention features of the search branch.

In step S104, the intermediate features are divided into N sets, each set includes the three feature maps obtained by 1×1 convolutions, and the three feature maps are respectively mapped as the query, key and value, which are expressed as:

$q_{i,j} = W_q \tilde{f}^i_{i,j}, k_{i,j} = W_k \tilde{f}^i_{i,j}, v_{i,j} = W_v \tilde{f}^i_{i,j},$ wherein $q_{i,j}$ represents a query feature mapping tensor of the pixel coordinate (i,j) in the input feature $F_i$, $k_{i,j}$ represents a key feature mapping tensor of the pixel coordinate (i,j) in the input feature $F_i$, $v_{i,j}$ represents a value feature mapping tensor of the pixel coordinate (i,j) in the input feature $F_i$, $W_q$ represents a projection matrix of the query, $W_k$ represents a projection matrix of the key, $W_v$ represents a projection matrix of the value, and $\tilde{f}^i_{i,j}$ represents the intermediate feature tensor of the input features.

In step S104, the first and second self-attention weights are expressed as:

$$A\left(W_q \tilde{f}^i_{i,j}, W_k \tilde{f}^i_{a,b}\right) = \underset{a,b\in R_k(i,j)}{\text{softmax}}\left(\frac{\left(W_q \tilde{f}^i_{i,j}\right)^T \left(W_k \tilde{f}^i_{a,b}\right)}{\sqrt{d}}\right),$$

wherein $A(W_q \tilde{f}^i_{i,j}, W_k \tilde{f}^i_{a,b})$ represents the self-attention weight, soft max(●) represents a normalized exponential activation function, d represents a query feature dimension, $R_k(i,j)$ represents a local area of the pixel in a spatial range r centered on the pixel coordinate (i,j), $\tilde{f}^i_{a,b}$ represents a feature tensor of the intermediate features at the pixel coordinate (a,b), and T represents a transposition operation.

Further, the method for calculating the global features with the self-attention weight and the value includes the following steps:

the summation operation is performed on the self-attention weight and the value feature mapping tensor to collect the global features, which is expressed as:

$$g^o_{i,j} = \|\left(\sum_{a,b\in R_k(i,j)} A\left(W_q \tilde{f}^i_{i,j}, W_k \tilde{f}^i_{a,b}\right) W_v \tilde{f}^i_{a,b}\right),$$

wherein $g^o_{i,j}$ represents an output feature tensor of a self-attention module, ‖ represents a concatenation operation of outputs of self-attention heads, and N represents the number of the self-attention heads. In this present application, the number of the self-attention heads is set to 4.

S105, connection of hybrid convolution feature with self-attention feature.

The hybrid convolution features of the template branch are connected with the self-attention features of the template branch to pass through a drop-out layer to obtain output features of the template branch of the aggregation modules based on hybrid convolution and self-attention.

The hybrid convolution features of the search branch are connected with the self-attention features of the search branch to pass through the drop-out layer to obtain output features of the search branch of the aggregation modules based on hybrid convolution and self-attention.

The aggregation modules based on hybrid convolution and self-attention are hierarchically stacked to establish a feature aggregation network with shared weights.

In step S105, the output feature of the aggregation modules based on hybrid convolution and self-attention is expressed as:

$F_{out} = \alpha F_{conv} + \beta F_{att},$ wherein $F_{out}$ represents the output feature of the aggregation modules based on hybrid convolution and self-attention, $F_{conv}$ represents the hybrid convolution feature, $F_{att}$ represents the self-attention feature, α represents a first deviation factor, and β represents a second deviation factor.

S106, object tracking.

The feature aggregation network is trained with a large-scale data set to obtain a tracking model. The output features of the template branch are fused with the output features of the search branch by a convolution operation according to the tracking model to obtain a response position of the object in the search region in order to realize accurate tracking.

The present disclosure proposes a method for tracking the object by the aggregation network based on hybrid convolution and self-attention. First, the corresponding template features and search features are obtained by the convolution operation, and respectively used as the input features of the template branch and the search branch in the aggregation module. Rich intermediate features can be obtained by performing the convolution operation on the input features.

In addition, the aggregation modules share the same convolution operation, and the hybrid convolution in the aggregation module uses the depthwise convolution and the pointwise convolution to separate the mixture between space and channel of the intermediate features. The redundancy in spatial and channel features can be reduced while increasing receptive field, and the local features can be obtained. The self-attention module in the aggregation module learns intermediate features, captures long-distance dependencies, and adaptively focuses on different regions to capture more global correlation. Finally, the output features of the hybrid convolution are added to the output features of the self-attention module, and the features by the addition pass through the drop-out layer to obtain the final output features. The output features aggregate local and global context information. Thereinto, the drop-out layer is added for alleviating the overfitting of the network during training, thereby improving the generalization ability of the tracker.

Figure 5:
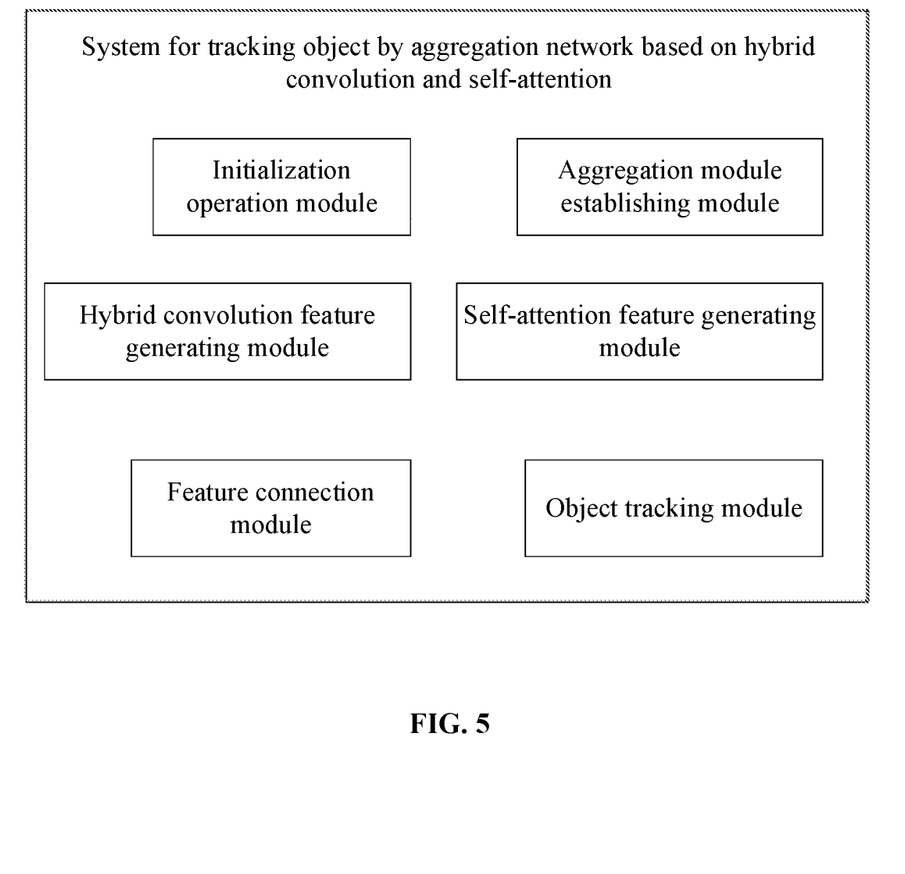
FIG. 5 is a structure diagram of the system for tracking the object by the aggregation network based on hybrid convolution and self-attention according to the present disclosure.

In other embodiments, a system for tracking an object by an aggregation network based on hybrid convolution and self-attention is also provided, as shown in FIG. 5. The system includes:

an initialization operation module, configured to:

initialize a given first image frame and a search region of a subsequent image frame respectively to obtain a target template image and a search image, and perform a convolution operation on the target template image and the search image respectively to obtain template features and search features;

an aggregation module establishing module, configured to:

establish a plurality of aggregation modules based on hybrid convolution and self-attention, perform a convolution operation on the template features and the search features for learning, and map the template features and the search features into a same feature space to obtain intermediate features of a template branch and intermediate features of a search branch respectively;

a hybrid convolution feature generating module, configured to:

input the intermediate features of the template branch into the hybrid convolution comprising a depthwise convolution and a pointwise convolution; process, by the hybrid convolution, the intermediate features of the template branch; and perform a concatenation operation to obtain hybrid convolution features of the template branch;

input the intermediate features of the search branch into the hybrid convolution comprising the depthwise convolution and the pointwise convolution; process, by the hybrid convolution, the intermediate features of the search branch; and perform the concatenation operation to obtain hybrid convolution features of the search branch;

a self-attention feature generating module, configured to:

input the intermediate features of the template branch into the self-attention; map, by the self-attention, the intermediate features of the template branch to obtain three feature maps respectively used as a query, key and value of the template branch in the self-attention; perform similarity matching on the query and key of the template branch to obtain a first self-attention weight; calculate global features of the template branch with the first self-attention weight and the value of the template branch; and perform the concatenation operation to obtain self-attention features of the template branch;

input the intermediate features of the search branch into the self-attention; map, by the self-attention, the intermediate features of the search branch to obtain three feature maps respectively used as a query, key and value of the search branch in the self-attention; perform similarity matching on the query and key of the search branch to obtain a second self-attention weight; calculate global features of the search branch with the second self-attention weight and the value of the search branch; and perform the concatenation operation to obtain self-attention features of the search branch;

a feature connection module, configured to:

connect the hybrid convolution features of the template branch with the self-attention features of the template branch to pass through a drop-out layer to obtain output features of the template branch of the aggregation modules based on hybrid convolution and self-attention;

connect the hybrid convolution features of the search branch with the self-attention features of the search branch to pass through the drop-out layer to obtain output features of the search branch of the aggregation modules based on hybrid convolution and self-attention;

hierarchically stack the aggregation modules based on hybrid convolution and self-attention to establish a feature aggregation network with shared weights; and an object tracking module, configured to:

train the feature aggregation network with a large-scale data set to obtain a tracking model; fuse the output features of the template branch with the output features of the search branch by a convolution operation according to the tracking model to obtain a response position of the object in the search region in order to realize accurate tracking.

It should be understood that each portion of the present disclosure can be implemented by hardware, software, firmware or a combination thereof. In the embodiments described above, various steps or methods may be implemented by software or firmware stored in memory and executed by a suitable instruction execution system. For example, if implemented in hardware, as implemented in another embodiment, it can be implemented by any one or combination of the following techniques known in the art: Discrete Logic Circuits with logic gate circuit for implementing logic functions on data signals, Application-Specific Integrated Circuits (ASICs) with suitable combinational logic gate circuits, Programmable Gate Arrays (PGAs), Field Programmable Gate Arrays (FPGAs), etc.

In the description of this specification, descriptions about the reference terms "one embodiment", "some embodiments", "example", "specific example", or "some examples" mean that specific features, structures, materials or characteristics described in conjunction with the embodiment or example is included in at least one embodiment or example of the present disclosure. In this specification, schematic indications of the above terms do not necessarily refer to the same embodiment or example. Furthermore, the specific features, structures, materials or characteristics described may be combined in any suitable manner into any one or more embodiments or examples.

The above-mentioned embodiments only express several implementations of the present disclosure, and the description thereof is relatively specific and detailed, but should not be understood as limitations to the scope of the present disclosure. It should be pointed out that those skilled in the art can make several modifications and improvements without departing from the conception of the present disclosure, all of which belong to the protection scope of the present disclosure. Therefore, the protection scope of the disclosure should be based on the appended claims.

What is claimed is:

1. A method for tracking an object by an aggregation network based on hybrid convolution and self-attention, which comprises:

step 1, initialization operation initializing a given first image frame and a search region of a subsequent image frame respectively to obtain a target template image and a search image; and performing a convolution operation on the target template image and the search image respectively to obtain template features and search features;

step 2, establishment of aggregation modules establishing a plurality of aggregation modules based on hybrid convolution and self-attention; performing a convolution operation on the template features and the search features for learning; and mapping the template features and the search features into a same feature space to obtain intermediate features of a template branch and intermediate features of a search branch respectively;

step 3, generation of hybrid convolution features inputting the intermediate features of the template branch into the hybrid convolution comprising a depthwise convolution and a pointwise convolution; processing, by the hybrid convolution, the intermediate features of the template branch; and performing a concatenation operation to obtain hybrid convolution features of the template branch;

inputting the intermediate features of the search branch into the hybrid convolution comprising the depthwise convolution and the pointwise convolution; processing, by the hybrid convolution, the intermediate features of the search branch; and performing the concatenation operation to obtain hybrid convolution features of the search branch;

step 4, generation of self-attention features inputting the intermediate features of the template branch into the self-attention; mapping, by the self-attention, the intermediate features of the template branch to obtain three feature maps respectively used as a query, key and value of the template branch in the self-attention; performing similarity matching on the query and key of the template branch to obtain a first self-attention weight; calculating global features of the template branch with the first self-attention weight and the value of the template branch; and performing the concatenation operation to obtain self-attention features of the template branch;

inputting the intermediate features of the search branch into the self-attention; mapping, by the self-attention, the intermediate features of the search branch to obtain three feature maps respectively used as a query, key and value of the search branch in the self-attention; performing similarity matching on the query and key of the search branch to obtain a second self-attention weight; calculating global features of the search branch with the second self-attention weight and the value of the search branch; and performing the concatenation operation to obtain self-attention features of the search branch;

step 5, connection of hybrid convolution features with self-attention features connecting the hybrid convolution features of the template branch with the self-attention features of the template branch to pass through a drop-out layer to obtain output features of the template branch of the aggregation modules based on hybrid convolution and self-attention;

connecting the hybrid convolution features of the search branch with the self-attention features of the search branch to pass through the drop-out layer to obtain output features of the search branch of the aggregation modules based on hybrid convolution and self-attention;

hierarchically stacking the aggregation modules based on hybrid convolution and self-attention to establish a feature aggregation network with shared weights; and step 6, object tracking training the feature aggregation network with a large-scale data set to obtain a tracking model; fusing the output features of the template branch with the output features of the search branch by a convolution operation according to the tracking model to obtain a response position of the object in the search region in order to realize accurate tracking.

2. The method for tracking the object by the aggregation network based on hybrid convolution and self-attention according to claim 1, wherein in step 2, performing the convolution operation on the template features and the search features for learning comprises:

decomposing a convolution with a convolution kernel of k×k into $k^2$ separate 1×1 convolutions, and performing projecting and mapping on the template features or the search features as input features with the $k^2$ separate 1×1 convolutions, wherein a corresponding formula is expressed as:

$$\tilde{f}_{i,j}{}^i = K_{p,q} f_{i,j}{}^i,$$

wherein $\tilde{f}_{i,j}{}^i$ represents an intermediate feature tensor of the input features, $f_{i,j}{}^i$ represents a feature tensor of the input feature $F_i$ at a pixel coordinate (i,j), $K_{p,q}$ represents a convolution kernel weight in a relative position (p,q) of the convolution kernel, i represents a horizontal coordinate of the pixel, and j represents a vertical coordinate of the pixel.

3. The method for tracking the object by the aggregation network based on hybrid convolution and self-attention according to claim 2, wherein in step 3, processing, by the hybrid convolution, the intermediate features of the template branch or the intermediate features of the search branch comprises: performing, by the hybrid convolution, a depth convolution shift and summation operation on the intermediate features of the template branch or the intermediate features of the search branch;

wherein an output feature tensor of the depth convolution shift and summation operation is expressed as:

$$f_{i,j}^D = \sum_{p,q \in (0,1,2)} \text{shift}\left(K_{p,q} \tilde{f}_{i+\Delta x, j+\Delta y}^j\right),$$

wherein $f_{i,j}^D$ represents the output feature tensor of the depth convolution shift and summation operation, shift represents a shift operation, $\tilde{f}_{i+\Delta x, j+\Delta y}{}^i$ represents an intermediate feature tensor after shifting, Σ represents a summation operation, Δx represents a horizontal displacement, and Δy represents a vertical displacement.

4. The method for tracking the object by the aggregation network based on hybrid convolution and self-attention according to claim 3, wherein step 3 further comprises:
mixing channel positions by the pointwise convolution, and inputting the output feature tensors of the hybrid convolution and the intermediate feature tensors of the input features into the pointwise convolution to select important channel features; and
performing the concatenation operation on the output feature tensors of the hybrid convolution to obtain the hybrid convolution features.

5. The method for tracking the object by the aggregation network based on hybrid convolution and self-attention according to claim 4, wherein the output feature tensor of the hybrid convolution is expressed as:

$$f_{i,j}^o = BN\left(\sigma\left(\sum_{p,q\in\{0,1,2\}} \text{shift}\left(K_{p,q}\left(f_{i,j}^D + \tilde{f}_{i,j}^i\right)\right)\right)\right),$$

wherein $f_{i,j}^o$ represents the output feature tensor of the hybrid convolution, BN(●) represents a batch normalization operation, and σ(●) represents a rectified linear activation function; and
the hybrid convolution feature is expressed as:

$$F_{conv}=\text{Concat}(f_{1,i,j}^o, \ldots, f_{n,i,j}^o),$$

wherein $F_{conv}$ represents the hybrid convolution feature, Concat(●) represents the concatenation operation, $f_{1,i,j}^o$ represents the output feature tensor of a first hybrid convolution, and $f_{n,i,j}^o$ represents the output feature tensor of a $n^{th}$ hybrid convolution.

6. The method for tracking the object by the aggregation network based on hybrid convolution and self-attention according to claim 5, wherein in step 4, the intermediate features are divided into N sets, each set comprises the three feature maps obtained by 1×1 convolutions, and the three feature maps are respectively mapped as the query, key and value, which are expressed as:

$$q_{i,j}=W_q\tilde{f}_{i,j}^i, k_{i,j}=W_k\tilde{f}_{i,j}^i, v_{i,j}=W_v\tilde{f}_{i,j}^i,$$

wherein $q_{i,j}$ represents a query feature mapping tensor of the pixel coordinate (i,j) in the input feature $F_i$, $k_{i,j}$ represents a key feature mapping tensor of the pixel coordinate (i,j) in the input feature $F_i$, $v_{i,j}$ represents a value feature mapping tensor of the pixel coordinate (i,j) in the input feature $F_i$, $W_q$ represents a projection matrix of the query, $W_k$ represents a projection matrix of the key, $W_v$ represents a projection matrix of the value, and $\tilde{f}_{i,j}^i$ represents the intermediate feature tensor of the input features.

7. The method for tracking the object by the aggregation network based on hybrid convolution and self-attention according to claim 6, wherein in step 4, the first and second self-attention weights are expressed as:

$$A\left(W_q\tilde{f}_{i,j}^i, W_k\tilde{f}_{a,b}^i\right) = \underset{a,b\in R_k(i,j)}{softmax}\left(\frac{\left(W_q\tilde{f}_{i,j}^i\right)^T\left(W_k\tilde{f}_{a,b}^i\right)}{\sqrt{d}}\right),$$

wherein $A(W_q\tilde{f}_{i,j}^i, W_k\tilde{f}_{a,b}^i)$ represents the self-attention weight, soft max(●) represents a normalized exponential activation function, d represents a query feature dimension, $R_k(i,j)$ represents a local area of the pixel in a spatial range r centered on the pixel coordinate (i,j), $\tilde{f}_{a,b}^i$ represents a feature tensor of the intermediate features at the pixel coordinate (a,b), and T represents a transposition operation.

8. The method for tracking the object by the aggregation network based on hybrid convolution and self-attention according to claim 7, wherein calculating the global features with the self-attention weight and the value comprises:
performing a summation operation on the self-attention weight and the value feature mapping tensor to collect the global features, which is expressed as:

$$g_{i,j}^o = \|\left(\sum_{a,b\in R_k(i,j)} A\left(W_q\tilde{f}_{i,j}^i, W_k\tilde{f}_{a,b}^i\right)W_v\tilde{f}_{a,b}^i\right),$$

wherein $g_{i,j}^o$ represents an output feature tensor of a self-attention module, ∥ represents a concatenation operation of outputs of self-attention heads, and N represents a number of the self-attention heads.

9. The method for tracking the object by the aggregation network based on hybrid convolution and self-attention according to claim 8, wherein in step 5, the output feature of the aggregation modules based on hybrid convolution and self-attention is expressed as:

$$F_{out}=\alpha F_{conv}+\beta F_{att},$$

wherein $F_{out}$ represents the output feature of the aggregation modules based on hybrid convolution and self-attention, $F_{conv}$ represents the hybrid convolution feature, $F_{att}$ represents the self-attention feature, α represents a first deviation factor, and β represents a second deviation factor.

10. A system for tracking an object by an aggregation network based on hybrid convolution and self-attention, which comprises:
an initialization operation module, configured to:
initialize a given first image frame and a search region of a subsequent image frame respectively to obtain a target template image and a search image, and perform a convolution operation on the target template image and the search image respectively to obtain template features and search features;
an aggregation module establishing module, configured to:
establish a plurality of aggregation modules based on hybrid convolution and self-attention, perform a convolution operation on the template features and the search features for learning, and map the template features and the search features into a same feature space to obtain intermediate features of a template branch and intermediate features of a search branch respectively;
a hybrid convolution feature generating module, configured to:
input the intermediate features of the template branch into the hybrid convolution comprising a depthwise convolution and a pointwise convolution; process, by the hybrid convolution, the intermediate features of the template branch; and perform a concatenation operation to obtain hybrid convolution features of the template branch;
input the intermediate features of the search branch into the hybrid convolution comprising the depthwise convolution and the pointwise convolution; process, by the hybrid convolution, the intermediate features of the search branch; and perform the concatenation operation to obtain hybrid convolution features of the search branch;

a self-attention feature generating module, configured to:

input the intermediate features of the template branch into the self-attention; map, by the self-attention, the intermediate features of the template branch to obtain three feature maps respectively used as a query, key and value of the template branch in the self-attention; perform similarity matching on the query and key of the template branch to obtain a first self-attention weight; calculate global features of the template branch with the first self-attention weight and the value of the template branch; and perform the concatenation operation to obtain self-attention features of the template branch;

input the intermediate features of the search branch into the self-attention; map, by the self-attention, the intermediate features of the search branch to obtain three feature maps respectively used as a query, key and value of the search branch in the self-attention; perform similarity matching on the query and key of the search branch to obtain a second self-attention weight; calculate global features of the search branch with the second self-attention weight and the value of the search branch; and perform the concatenation operation to obtain self-attention features of the search branch;

a feature connection module, configured to:

connect the hybrid convolution features of the template branch with the self-attention features of the template branch to pass through a drop-out layer to obtain output features of the template branch of the aggregation modules based on hybrid convolution and self-attention;

connect the hybrid convolution features of the search branch with the self-attention features of the search branch to pass through the drop-out layer to obtain output features of the search branch of the aggregation modules based on hybrid convolution and self-attention;

hierarchically stack the aggregation modules based on hybrid convolution and self-attention to establish a feature aggregation network with shared weights; and an object tracking module, configured to:

train the feature aggregation network with a large-scale data set to obtain a tracking model; fuse the output features of the template branch with the output features of the search branch by a convolution operation according to the tracking model to obtain a response position of the object in the search region in order to realize accurate tracking.

* * * * *